United States Patent
May et al.

(10) Patent No.: US 10,934,211 B2
(45) Date of Patent: Mar. 2, 2021

(54) MODIFIED SODIUM BENTONITE CLAYS FOR BARRIER LAYER APPLICATIONS

(71) Applicant: Halliburton Energy Services, Inc., Houston, TX (US)

(72) Inventors: Preston Andrew May, Porter, TX (US); Ryan Patrick Collins, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 237 days.

(21) Appl. No.: 15/760,217

(22) PCT Filed: Oct. 16, 2015

(86) PCT No.: PCT/US2015/055869
§ 371 (c)(1),
(2) Date: Mar. 14, 2018

(87) PCT Pub. No.: WO2017/065789
PCT Pub. Date: Apr. 20, 2017

(65) Prior Publication Data
US 2019/0039950 A1    Feb. 7, 2019

(51) Int. Cl.
*C04B 22/10* (2006.01)
*C04B 14/10* (2006.01)
(Continued)

(52) U.S. Cl.
CPC ............ *C04B 14/104* (2013.01); *C04B 22/10* (2013.01); *C04B 24/2652* (2013.01);
(Continued)

(58) Field of Classification Search
CPC ... C04B 24/2652; C04B 24/38; C04B 28/001; C04B 22/10; E02D 31/004
See application file for complete search history.

(56) References Cited

U.S. PATENT DOCUMENTS

| 5,538,787 A | 7/1996 | Nachtman et al. |
| 5,578,219 A | 11/1996 | Kajita |

(Continued)

FOREIGN PATENT DOCUMENTS

EP    0171962    2/1986

OTHER PUBLICATIONS

International Search Report and Written Opinion from PCT/US2015/055869, dated May 31, 2016, 14 pages.

*Primary Examiner* — Daniel J Wiley
(74) *Attorney, Agent, or Firm* — Tenley Krueger; C. Tumey Law Group PLLC (57) ABSTRACT

The permeability of barrier layers formed from sodium bentonite clay may be significantly and unpredictably impacted upon contacting various ionic substances. Modifying agents may be admixed with sodium bentonite clay to lessen the impacts resulting from its contact with an ionic substance. Suitable modifying agents may comprise an anionic substance selected from the group consisting of a diutan, a polymer containing a 2-acrylamido-2-methylpropanesulfonic acid monomer, any salt thereof, and any combination thereof. Methods for forming a barrier layer may comprise: providing a barrier material comprising sodium bentonite clay and a modifying agent admixed with the sodium bentonite clay, the modifying agent comprising an anionic substance selected from the group consisting of a diutan, a polymer containing a 2-acrylamido-2-methylpropanesulfonic acid monomer, any salt thereof, and any combination thereof; and forming a barrier layer comprising the barrier material.

20 Claims, 6 Drawing Sheets

(51) Int. Cl.
   *E02D 31/00* (2006.01)
   *C04B 28/00* (2006.01)
   *C04B 24/26* (2006.01)
   *C04B 24/38* (2006.01)
   *C04B 111/00* (2006.01)

(52) U.S. Cl.
   CPC ............ *C04B 24/38* (2013.01); *C04B 28/001* (2013.01); *E02D 31/004* (2013.01); *C04B 2111/00775* (2013.01); *E02D 2300/0042* (2013.01)

(56) References Cited

U.S. PATENT DOCUMENTS

| | | |
|---|---|---|
| 5,970,893 A | 10/1999 | Starita et al. |
| 6,340,385 B1 | 1/2002 | Wammes |
| 6,737,472 B2 | 5/2004 | Zhou et al. |
| 6,777,480 B2 | 8/2004 | Payzant et al. |
| 7,026,385 B2 | 4/2006 | Wammes et al. |
| 8,318,616 B2 | 11/2012 | Donovan et al. |
| 9,550,879 B2 | 1/2017 | Donovan et al. |
| 9,758,432 B2 * | 9/2017 | Landis ................. C04B 28/001 |
| 2005/0065261 A1 | 3/2005 | Darlington et al. |
| 2010/0189509 A1 | 7/2010 | Filshill et al. |
| 2012/0216707 A1 | 8/2012 | Youngblood et al. |
| 2012/0219366 A1 | 8/2012 | Landis et al. |
| 2012/0219367 A1 | 8/2012 | Landis et al. |
| 2013/0145959 A1 | 6/2013 | Di Emidio |
| 2014/0302735 A1 | 10/2014 | Donovan et al. |
| 2015/0018594 A1 | 1/2015 | Webb et al. |
| 2016/0289418 A1 | 10/2016 | Donovan et al. |

* cited by examiner

MODIFIED SODIUM BENTONITE CLAYS FOR BARRIER LAYER APPLICATIONS

BACKGROUND

The present disclosure generally relates to compositions containing sodium bentonite clay and, more specifically, to barrier layers formed from modified sodium bentonite clays and associated methods.

Low-permeability barriers may be utilized in a variety of settings to prevent contact from occurring between a hazardous or potentially hazardous material and its surrounding environment. As used herein, the term "containment" and other grammatical forms thereof will generally refer to the retention of a substance within a desired location, such as to prevent contact from occurring with its surrounding environment. The substance being retained may be a hazardous or substantially non-hazardous liquid or solid. Non-limiting settings in which it can be desirable to provide containment of a substance include, for example, retention of contaminated fluids within landfills, retention ponds, mining sites, and hazardous materials repositories such as those housing heavy metals, fly ash, coal ash, radioactive waste, and mining waste. Fluid containment within non-contaminated or substantially non-contaminated sources such as, for example, livestock ponds, decorative ponds, reservoirs, and like holding locations can also be highly desirable.

As used herein, the term "leachate" will refer to an effluent that potentially carries a substance away from a location where it was intended to remain. For example, the percolation of rainwater or another water source through the solid material of a landfill or a hazardous materials repository may produce an extracted leachate that results in transportation of a previously immobilized hazardous or potentially hazardous substance. Unless proper containment protocols are in place, the leachate may transport a hazardous substance beyond the bounds of the landfill or repository area. If not properly contained, leachates can present serious environmental concerns, including contamination of aquifers, rivers, streams, and agricultural areas. Hazardous liquids in a holding facility may present similar issues in the event of primary containment failure (e.g., rupture of a holding drum).

In the case of ponds, reservoirs, and other non-hazardous bodies of water, leakage of water may occur over time if the body of water is not properly sealed to provide containment. Water leakage can be undesirable simply from the standpoint of loss of a valuable natural resource. Moreover, there can be subsequent impacts resulting from low water levels such as, for example, decreased property values, agricultural failure, and harm to both land and marine organisms.

Clay barriers are often used to promote containment within various types of retention facilities such as ponds, reservoirs, landfills, and the like. Upon depositing a thin layer of clay and contacting the clay with water, the clay can swell to form a barrier that may substantially preclude fluids from passing therethrough. Accordingly, a clay barrier may help seal a pond or reservoir against leakage or promote retention of a leachate within the bounds of an intended storage facility.

There are two primary techniques for positioning a clay barrier around a pond, reservoir, or retention facility. One technique involves compressing a clay composition against the surrounding soil, or admixing the clay composition with soil and then compressing the soil mixture. Upon hydration, a relatively thick, unsupported clay barrier is produced. A more recent technique involves incorporating a clay composition within or upon a flexible supporting material, which may then be used to line the pond, reservoir, or retention facility without the need for compaction. The supported clay composition is commonly referred to as a "geosynthetic clay liner." Although geosynthetic clay liners usually need to be manufactured and transported to a job site, they may ultimately be simpler to install and less costly compared to a compacted clay barrier. In addition, significantly smaller amounts of clay may be needed when forming a clay barrier with a geosynthetic clay liner.

Although both compacted clay barriers and geosynthetic clay liners may be used effectively to promote retention of a substance within a desired location, they are not without their limitations. In both instances, ionic substances can significantly impact the effectiveness of a barrier layer formed by the clay composition. Namely, ionic substances can alter the extent to which the clay material swells, potentially impacting its ability to form an effective barrier layer if swelling is incomplete. Moreover, different ionic substances or mixtures thereof can alter the swelling process to variable extents, and the degree of alteration may be fairly unpredictable depending upon the particular ionic substance(s) that are present and their relative proportions to one another. Illustrative cations and anions that may produce erratic swelling upon contacting a clay material include, for example, calcium, magnesium, potassium, iron, zirconium, lead, cobalt, copper, tin, aluminum, silver, sulfate, chloride, fluoride, bromide, the like, and mixtures thereof.

Depending upon the source from which they are produced, leachates often comprise variable proportions of high-concentration metal ions and other electrolytes, so their containment may be particularly difficult to address as a result. In some instances, upfront testing may be needed when forming a barrier layer with conventional clay materials to determine if they are suitable for use in a particular type of ionic environment. Oftentimes, this may necessitate knowing beforehand the type(s) of substances to be housed at a retention facility before it is even constructed.

Sodium bentonite clay is a frequently used clay material for forming barrier layers due to its high expansion capabilities; however, other clay materials may be used similarly in this regard. When first obtained from an earthen source, sodium bentonite clay mined from Wyoming, for example, often has a moisture content that is about 30 wt. % to about 35 wt. % water. In many instances, the moisture content may be lowered to about 6 wt. % to about 15 wt. % water, which is considered to constitute "dry bentonite" by one having ordinary skill in the art, despite the residual moisture content. Such "dry bentonite" may be re-hydrated to form a barrier layer in accordance with the description above. Like other clays, sodium bentonite may be susceptible to highly variable swelling the presence of different ionic environments, as previously indicated.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

The present disclosure generally relates to compositions containing sodium bentonite clay and, more specifically, to barrier layers formed from modified sodium bentonite clays and associated methods.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, sodium bentonite clay and other clay materials may be used for forming low-permeability barrier layers to promote retention of a hazardous or non-hazardous substance in a desired location. Such barrier layers may be formed via compaction or geosynthetic clay liner techniques. The ability of sodium bentonite and other clay materials to form a barrier layer is believed to occur through hydration and subsequent swelling of the clay material. Ionic substances may unpredictably alter this process, and a robust barrier layer may not be formed in certain types of ionic environments. Poor containment of a hazardous substance can represent a significant environmental concern and a major financial liability. Even having upfront knowledge of a clay material's performance in the presence of various ions may not completely eliminate the possibility of containment failure, since the field ionic conditions may not mimic those tested or they may change over time. Moreover, once a barrier layer has been installed in a location, it can be technically difficult and expensive to repair or alter the barrier layer and reinstate containment in situ, if the barrier layer can even be repaired or altered at all.

As further discussed above, sodium bentonite clay can be a particularly desirable material for use in forming a barrier layer. Although sodium bentonite clay alone can sometimes form a competent barrier layer upon swelling, various modifying agents can sometimes be included with the clay in order to enhance the barrier layer's performance in the presence of ionic substances. Anionic polymers such as polyanionic cellulose and partially hydrolyzed polyacrylamide may be used in this regard. Biopolymers such as guar may be used similarly. However, the performance of polyanionic cellulose and guar can also be somewhat erratic depending upon the particular ionic environment to which the clay material is exposed. Namely, the relative extent of performance enhancement may vary significantly in the presence of different ions.

The present inventors discovered various modifying agents that may surprisingly enhance the barrier layer performance of sodium bentonite clay in comparison to conventionally used modifying agents, such as polyanionic cellulose and guar. At least some of the modifying agents disclosed herein may provide consistently superior performance relative to a comparable loading of the foregoing conventional modifying agents. Moreover, the performance of the presently described modifying agents may be more consistent across a range of ionic substances, whereas conventionally used modifying agents may be much more variable from ion to ion. Accordingly, in addition to providing their superior performance, the presently described modifying agents may advantageously lessen or eliminate the degree of upfront testing needed prior to deployment of a barrier layer formed from sodium bentonite clay to determine its performance in a particular ionic environment.

More specifically, the present inventors discovered various anionic substances that may provide superior performance compared to that of conventional modifying agents typically used in combination with sodium bentonite clay. Two distinct classes of anionic substances are described herein, each of which may provide particular advantages in a given situation: diutan, a naturally occurring anionic biopolymer, and synthetic acrylamide copolymers containing sulfonate anions. In some instances, the anionic substances may be crosslinked to regulate their properties further.

The present inventors discovered that the anionic biopolymer diutan may provide superior performance and other advantages compared to conventionally used biopolymer modifying agents, such as guar. Foremost, diutan is naturally functionalized with carboxylic acid groups, which are believed to provide superior performance compared to the neutral functionalities of guar. Hence, diutan naturally combines the polysaccharide features of guar with the carboxylic acid features of polyanionic cellulose in order to convey enhanced performance to a barrier layer. The performance of diutan is surprising compared to other carboxylate-containing polysaccharides, such as alginate and xanthan, which typically give significantly poorer performance. Without being bound by theory or mechanism, it is believed that the carboxylate anions in diutan interact more strongly with sodium bentonite clay than do the neutral functionalities of guar or the carboxylate anions of other types of biopolymers.

In the synthetic polymer realm, the inventors discovered that various copolymers containing a 2-acrylamido-2-methylpropanesulfonic acid (AMPS) monomer may provide significantly enhanced performance compared to conventionally used modifying agents for sodium bentonite clay. In addition to their enhanced performance compared to guar and other biopolymer-based modifying agents, synthetic polymers may provide a decreased risk of inducing unwanted bacterial growth, since synthetic polymers are not typically prone to biodegradation.

In addition to the above advantages individually afforded by the anionic modifying agents of the present disclosure, barrier materials comprising such modifying agents may provide a number of further advantages in the course of forming a barrier layer therefrom. Since the modifying agents described herein are relatively inexpensive materials, bentonite clays containing these modifying agents may have a similar cost structure compared to those containing polyanionic cellulose or guar. In fact, because their performance may be improved compared to that of conventional modifying agents, the presently disclosed modifying agents may be preferable from a cost of goods standpoint by lowering the overall amount of modifying agent and/or sodium bentonite clay that is needed for forming a barrier layer. Moreover, because the modifying agents described herein may provide consistent performance across a range of ionic conditions, they may allow barrier layers to be formed in a greater variety of deployment locales than is presently possible. Similarly, they may allow a greater breadth of substances to be housed within a containment structure, including substances for which clay-based barrier layers might not otherwise be suitable. Because their performance may be less variable than conventional modifying agents, the modifying agents described herein may decrease the extent of upfront testing needed before deploying a barrier layer. Finally, the barrier materials described herein may be suitably used alone in the formation of a compacted soil barrier or within a geosynthetic clay liner, thereby allowing a wide range of barrier layers to be fabricated.

In various embodiments, the present disclosure provides barrier materials comprising sodium bentonite clay, and a modifying agent admixed with the sodium bentonite clay, where the modifying agent comprises an anionic substance selected from the group consisting of a diutan, a polymer containing a 2-acrylamido-2-methylpropanesulfonic acid monomer, any salt thereof, and any combination thereof. Particularly suitable salt forms for the modifying agents may include the sodium salt form and the ammonium salt form, for example. Such barrier materials may be used alone, such as during the fabrication of a compacted clay barrier upon or within soil, or incorporated within a geosynthetic clay liner, as discussed hereinbelow.

In addition to the modifying agent and the sodium bentonite clay, the barrier materials described herein may comprise a breadth of additional substances, some of which are discussed hereinafter. The additional substance(s) chosen, as well as the identity and amount of the modifying agent, may be dictated, at least in part, by whether the barrier material is to be fabricated into a compacted clay barrier with soil or disposed in a geosynthetic clay liner. Some particular considerations regarding additional substances that may be present are addressed further hereinbelow.

The sodium bentonite clay within the barrier material may comprise a natural bentonite or a modified bentonite. As used herein, the term "natural bentonite" will refer to a bentonite clay that is obtained natively in its sodium form. As used herein, the term "modified bentonite" will refer to a bentonite clay that is natively obtained in a non-sodium form and is subsequently converted into the sodium form prior to incorporation in the barrier material. Both granular and powdered sodium bentonite clay may be suitable for use in the embodiments of the present disclosure; however, for ease of manufacturing, granular sodium bentonite clay may be somewhat more desirable. Suitable high quality sodium bentonite clay is commercially available as NATIONAL® Standard and/or Premium Bentonite from Bentonite Performance Minerals LLC, a subsidiary of Halliburton Energy Services. Other sources and grades of sodium bentonite clay may also be suitable. Sodium bentonite's propensity to swell upon hydration may make it especially useful in the barrier layer applications discussed herein. The modifying agent admixed with the sodium bentonite clay may help the sodium bentonite clay retain its swelling capabilities in various ionic environments, whereas this capability may be diminished when the modifying agent is not present.

In general, the particulate size of the sodium bentonite clay may be chosen in order to promote its capability of forming a competent barrier layer. In specific embodiments, the sodium bentonite clay may have a $d_{90}$ particulate size between about 60 mesh and about 6 mesh (about 0.25 mm to about 3.36 mm). In other particular embodiments, the sodium bentonite clay may have a $d_{50}$ particulate size between about 400 mesh and about 20 mesh (about 0.037 mm to about 0.84 mm).

In some embodiments, the sodium bentonite clay used in the barrier materials of the present disclosure may be pre-hydrated, if desired. For instance, pre-hydrated sodium bentonite clay having a moisture content of up to about 50 wt. % may be used in some applications. Pre-hydration of the sodium bentonite clay may be particularly desirable for disposing the barrier material as a geosynthetic clay liner.

In other various embodiments, the sodium bentonite clay used in the barrier materials may have an as-obtained moisture content of about 30 wt. % to about 35 wt. %. In other embodiments, the barrier materials of the present disclosure may contain "dry" sodium bentonite clay having a moisture content of about 6 wt. % to about 15 wt. %. Moisture contents between those of "dry" sodium bentonite clay and "as-obtained" sodium bentonite clay (i.e., a moisture content between about 15 wt. % and about 30 wt. %) may also be used.

The loading of sodium bentonite clay in the barrier materials of the present disclosure may vary over a considerable range. In some embodiments, the barrier materials may comprise about 85 wt. % or higher sodium bentonite clay by weight of the barrier material. In more particular embodiments, the barrier materials may comprise about 90 wt. % or higher sodium bentonite clay, or about 95 wt. % or higher sodium bentonite clay, or about 98 wt. % or higher sodium bentonite clay, or about 99 wt. % or higher sodium bentonite clay, or about 99.5 wt. % or higher sodium bentonite clay. The chosen amount of the sodium bentonite clay may be selected to accommodate a sufficient loading of the modifying agent to provide satisfactory performance upon fabrication of the barrier material into a barrier layer.

Although the barrier materials described herein contain sodium bentonite clay, it is to be recognized that other clay sources may also be suitable. Other illustrative clays that may be utilized in the barrier materials disclosed herein include, for example, kaolinite and illite.

As discussed above, various co-polymers containing a 2-acrylamido-2-methylpropanesulfonic acid monomer may be used according to the present disclosure in order to enhance the performance of sodium bentonite clay in forming a barrier layer. As used herein, the term "co-polymer" will refer to any polymer containing two or more different types of monomer units, including terpolymers and higher-order polymers. The ordering of the monomer units within the co-polymers may be repeating, block and/or random. Particularly suitable co-polymers containing a 2-acrylamido-2-methylpropanesulfonic acid monomer unit may include, for example, a copolymer of 2-acrylamido-2-methylpropanesulfonic acid and acrylamide; a copolymer of 2-acrylamido-2-methylpropanesulfonic acid, acrylamide and 2-vinylpyrollidone; and a copolymer of 2-acrylamido-2-methylpropanesulfonic acid, acrylamide and acrylic acid. Suitable co-polymers may also include those in which at least a portion or all of the acrylamide monomer units are hydrolyzed top acrylic acid monomer units.

In some embodiments, anionic biopolymers other than diutan may be used in the barrier materials of the present disclosure. For example, in some embodiments, welan gums or gellan gums may be suitable for forming a barrier layer.

The anionic substances of the presently described barrier materials may comprise polymers whose molecular weights vary over a wide range. For example, number average molecular weights of the polymers used in the embodiments of the present disclosure may range between about 250,000 and about 20,000,000. In more particular embodiments, the molecular weight of the polymer may range between about 250,000 and about 10,000,000, or between about 2,000,000 and about 10,000,000, or between about 2,000,000 and about 5,000,000 or between about 5,000,000 and about 10,000,000.

In some embodiments, the modifying agents described hereinabove may further comprise an inorganic base. Without being bound by any theory or mechanism, it is believed that an inorganic base may promote deprotonation of the modifying agent and improve its ability to enhance a barrier layer. In more particular embodiments, the inorganic base may comprise sodium carbonate. Sodium carbonate, in particular, may function as an effective water-softening agent, which may lead to better hydration of the sodium bentonite clay and enhanced formation of a fluid seal. Other suitable inorganic bases may include, for example, sodium bicarbonate, sodium hydroxide, or a mixture thereof.

In various embodiments, the barrier materials of the present disclosure may comprise about 0.1. wt. % to about 15 wt. % of the modifying agent. In more particular embodiments, the barrier materials of the present disclosure may comprise about 0.1 wt. % to about 0.5 wt. % of the modifying agent, or about 0.25 wt. % to about 1 wt. % of the modifying agent, or about 0.5 wt. % to about 2 wt. % of the modifying agent. Factors to consider in choosing a suitable loading of the modifying agent may include, for example, the identity and concentration of various ionic materials that are to come into contact with a barrier layer formed from the barrier materials.

In addition to the modifying agents described above, the barrier materials of the present disclosure may include further additives. For example and as also discussed above, an inorganic base such as sodium carbonate may be present in combination with the modifying agent. When present, the further additives may be present at a loading of about 1 wt. % to about 8 wt. % of the barrier material The barrier materials of the present disclosure may be utilized in a free form described above (e.g., as an independent admixture of sodium bentonite clay and the modifying agent, such as for forming a compacted clay barrier), or they may fabricated as a geosynthetic clay liner. The geosynthetic clay liner may comprise multiple geosynthetic layers between which the sodium bentonite clay is sandwiched or a single geosynthetic layer to which the sodium bentonite clay is adhesively bonded. As used herein, the term "geosynthetic layer" will refer to any one of geotextiles (i.e., fabrics), geofilms, and geomembranes, illustrative examples of which are presented hereinbelow. In either case, the barrier material may be deposited upon a surface for forming a barrier layer. Further disclosure in this regard follows below.

Accordingly, in some embodiments, barrier materials of the present disclosure may further comprise a first geosynthetic layer and a second geosynthetic layer, with the sodium bentonite clay and the modifying agent being sandwiched between the first geosynthetic layer and the second geosynthetic layer. In more particular embodiments, the sodium bentonite clay and the modifying agent admixed therewith may be bonded to at least one of the geosynthetic layers. Suitable techniques for bonding the sodium bentonite clay and the admixed modifying agent may include, for example, adhesive bonding or mechanical bonding. Suitable mechanical bonding techniques may include, for example, needle punching, compression, stitch bonding, or any combination thereof. In some embodiments, the sodium bentonite clay and the admixed modifying agent may be distributed uniformly when sandwiched between the first geosynthetic layer and the second geosynthetic layer.

In some embodiments, the first and second geosynthetic layers may have thicknesses ranging between about 2 mm and about 25 mm. In other embodiments, at least one of the first and second geosynthetic layers may be about 2 mm or under in thickness, such as between about 0.1 mm and about 2 mm in thickness, or between about 0.5 mm and 1.5 mm in thickness.

Suitable geotextiles for use in conjunction with the present disclosure include permeable fabrics that may allow access of the sandwiched sodium bentonite clay to water in order to undergo swelling to form a barrier layer. Illustrative geotextiles may comprise polyethylene, polypropylene, polyester, or blends thereof, and can be woven or nonwoven. Needle-punched and/or heat-bonded geotextiles represent illustrative examples of nonwoven geotextiles. In more specific embodiments, suitable geotextiles may include, for example, polypropylene or polyethylene nonwoven or woven geotextiles, polyethylene terephthalate woven or nonwoven geotextiles, or woven or nonwoven geotextiles comprising a blend of polypropylene and polyethylene terephthalate.

Geomembranes include low-permeability polymer layers that are about 10 mm or greater in thickness. Suitable polymers for fabricating geomembranes may include, for example, high-density polyethylene, low-density polyethylene, linear low-density polyethylene, polypropylene, polyvinyl chloride, thermoplastic polyolefins, ethylene propylene diene monomer rubbers, and various blends thereof. In some embodiments, a geomembrane may be further reinforced with a geotextile.

Geofilms are thinner than geomembranes and include low-permeability polymer layers that are about 10 mm or less in thickness, such as about 1 mm to about 10 mm in thickness. Geofilms may likewise be laminated onto or coated on a geotextile in order to modify the geotextile's properties further. That is, in some embodiments, a geofilm may intervene between the sodium bentonite clay and at least one of the first geosynthetic layer or the second geosynthetic layer. Geofilms may be formed from similar polymers to those described above for geomembranes. Suitable lamination techniques may include, for example, heat processes and adhesive bonding. The use of coatings or laminations may improve the durability of a barrier layer formed from the barrier material.

In other various embodiments, the barrier materials of the present disclosure may be fabricated as a geosynthetic clay liner having only a single geosynthetic layer. In more specific embodiments, such barrier materials may further comprise a geomembrane to which the sodium bentonite clay and the modifying agent are adhesively bonded.

Accordingly, the present disclosure also contemplates methods for forming a barrier layer using the barrier materials described hereinabove. The barrier layers may be compacted barrier layers (e.g., upon or admixed with soil) or disposed as a geosynthetic clay liner.

In some embodiments, methods of the present disclosure may comprise: providing a barrier material comprising sodium bentonite clay and a modifying agent admixed with the sodium bentonite clay, the modifying agent comprising an anionic substance selected from the group consisting of a diutan, a polymer containing a 2-acrylamido-2-methylpropanesulfonic acid monomer, any salt thereof, and any combination thereof; and forming a barrier layer comprising the barrier material. In further embodiments, methods of the present disclosure may further comprise mixing the sodium bentonite clay and the modifying agent together to form the barrier material used in forming a containment structure comprising the barrier layer.

In some embodiments, the barrier layer may comprise a compacted layer of the barrier material upon soil or admixed with soil. That is, in such embodiments, forming the barrier layer may comprise compacting the barrier material upon soil, or forming a soil mixture comprising the barrier material and compacting the soil mixture. Suitable techniques for compacting the barrier material upon or admixed with soil are not considered to be particularly limited and will be familiar to one having ordinary skill in the art.

In other various embodiments, the barrier layer may be disposed as a geosynthetic clay liner. That is, in such embodiments, forming the barrier layer may comprise applying at least one layer of a geosynthetic clay liner containing the barrier material upon a surface. As discussed above, the geosynthetic clay liner may comprise a first geosynthetic layer and a second geosynthetic layer, where the sodium bentonite clay and the modifying agent are sandwiched between the first geosynthetic layer and the second geosynthetic layer, or the sodium bentonite clay and the modifying agent may be bonded to a single geosynthetic layer comprising a geomembrane. Suitable geosynthetic layers may include those discussed above.

The barrier layer may comprise at least a portion of a containment structure. The type of containment structure defined by the barrier layer is not considered to be particularly limited. In illustrative embodiments, the barrier layer may comprise a portion of a pond, a reservoir, a landfill, a mining site, a fly ash repository site, or a coal ash repository site. In some embodiments, the barrier layer may simply help prevent loss of a liquid that is housed within the containment structure. For example, the barrier layer may help prevent leakage of water from a pond or reservoir. In other various embodiments, the barrier layer may help retain a leachate that has been formed within the containment structure. For example, a leachate may be formed upon percolation of water through a solid material that is housed in the containment structure.

Accordingly, in more specific embodiments, methods of the present disclosure may comprise contacting a leachate with the barrier layer. The leachate may contain various ionic substances that may compromise the ability of the sodium bentonite clay to form a competent barrier layer, unless the modifying agent is present. For example, a leachate formed upon percolating water through a landfill or hazardous waste repository may be replete with various metal ions and other ionic species, which may compromise the ability of the sodium bentonite clay to form a competent barrier layer. In illustrative embodiments, the leachate contacting the barrier layer may comprise at least one ionic substance selected from the group consisting of potassium ions, calcium ions, magnesium ions, iron ions, aluminum ions, zirconium ions, lead ions, cobalt ions, copper ions, tin ions, silver ions, fluoride ions, chloride ions, bromide ions, sulfate ions, and any combination thereof.

Embodiments disclosed herein include:

A. Clay-based barrier materials. The barrier materials comprise: sodium bentonite clay; and a modifying agent admixed with the sodium bentonite clay, the modifying agent comprising an anionic substance selected from the group consisting of a diutan, a polymer containing a 2-acrylamido-2-methylpropanesulfonic acid monomer, any salt thereof, and any combination thereof.

B. Methods for forming a barrier layer. The methods comprise: providing a barrier material comprising sodium bentonite clay and a modifying agent admixed with the sodium bentonite clay, the modifying agent comprising an anionic substance selected from the group consisting of a diutan, a polymer containing a 2-acrylamido-2-methylpropanesulfonic acid monomer, any salt thereof, and any combination thereof; and forming a barrier layer comprising the barrier material.

Each of embodiments A and B may have one or more of the following additional elements in any combination:

Element 1: wherein the sodium bentonite clay has a $d_{90}$ between about 6 mesh and about 60 mesh.

Element 2: wherein the modifying agent comprises a copolymer of 2-acrylamido-2-methylpropanesulfonic acid and acrylamide.

Element 3: wherein the modifying agent comprises a copolymer of 2-acrylamido-2-methylpropanesulfonic acid, acrylamide and acrylic acid.

Element 4: wherein the modifying agent comprises a copolymer of 2-acrylamido-2-methylpropanesulfonic acid, acrylamide and 2-vinylpyrollidone.

Element 5: wherein the modifying agent further comprises an inorganic base.

Element 6: wherein the inorganic base comprises sodium carbonate.

Element 7: wherein the barrier material comprises about 0.1 wt. % to about 15 wt. % of the modifying agent.

Element 8: wherein the barrier material further comprises a first geosynthetic layer and a second geosynthetic layer, the sodium bentonite clay and the modifying agent being sandwiched between the first geosynthetic layer and the second geosynthetic layer.

Element 9: wherein the first geosynthetic layer and the second geosynthetic layer are independently selected from the group consisting of a fabric and a geomembrane.

Element 10: wherein the sodium bentonite clay and the modifying agent are adhesively or mechanically bonded to at least one of the first geosynthetic layer or the second geosynthetic layer.

Element 11: wherein the barrier material further comprises a geofilm intervening between the sodium bentonite clay and at least one of the first geosynthetic layer or the second geosynthetic layer.

Element 12: wherein the barrier material further comprises a geomembrane to which the sodium bentonite clay and the modifying agent are adhesively bonded.

Element 13: wherein the method further comprises mixing the sodium bentonite clay and the modifying agent together to form the barrier material.

Element 14: wherein forming the barrier layer comprises compacting the barrier material upon soil, or forming a soil mixture comprising the barrier material and compacting the soil mixture.

Element 15: wherein forming the barrier layer comprises applying a geosynthetic clay liner to a surface, the geosynthetic clay liner comprising a first geosynthetic layer and a second geosynthetic layer, the sodium bentonite clay and the modifying agent being sandwiched between the first geosynthetic layer and the second geosynthetic layer.

Element 16: wherein forming the barrier layer comprises applying a geosynthetic clay liner to a surface, the geosynthetic clay liner comprising a geomembrane to which the sodium bentonite clay and the modifying agent are adhesively bonded.

Element 17: wherein the barrier layer comprises a portion of a pond, a reservoir, a landfill, a mining site, a fly ash repository site, or coal ash repository site.

Element 18: wherein the method further comprises contacting a leachate with the barrier layer, the leachate comprising an ionic substance.

Element 19: wherein the leachate comprises at least one ionic substance selected from the group consisting of potassium ions, calcium ions, magnesium ions, iron ions, aluminum ions, zirconium ions, lead ions, cobalt ions, copper ions, tin ions, silver ions, fluoride ions, chloride ions, bromide ions, sulfate ions, and any combination thereof.

By way of non-limiting example, exemplary combinations applicable to A and B include:

The barrier material of A or the method of B in combination with elements 1 and 2.

The barrier material of A or the method of B in combination with elements 1 and 3.

The barrier material of A or the method of B in combination with elements 1 and 4.

The barrier material of A or the method of B in combination with elements 1, 5 and 6.

The barrier material of A or the method of B in combination with elements 1 and 8.

The barrier material of A or the method of B in combination with elements 1 and 12.

The barrier material of A or the method of B in combination with elements 2, 5 and 6.

The barrier material of A or the method of B in combination with elements 3, 5 and 6.

The barrier material of A or the method of B in combination with elements 4, 5 and 6.

The barrier material of A or the method of B in combination with elements 2 and 8.

The barrier material of A or the method of B in combination with elements 3 and 8.

The barrier material of A or the method of B in combination with elements 4 and 8.

The barrier material of A or the method of B in combination with elements 2 and 12.

The barrier material of A or the method of B in combination with elements 3 and 12.

The barrier material of A or the method of B in combination with elements 4 and 12.

The barrier material of A or the method of B in combination with elements 8 and 9.

The barrier material of A or the method of B in combination with elements 8-10.

The barrier material of A or the method of B in combination with elements 8 and 11.

The method of B in combination with elements 13 and 15.
The method of B in combination with elements 13 and 16.
The method of B in combination with elements 14 and 15.
The method of B in combination with elements 14 and 16.
The method of B in combination with elements 14 and 17.
The method of B in combination with elements 15 and 17.
The method of B in combination with elements 16 and 17.
The method of B in combination with elements 15 and 18.
The method of B in combination with elements 16 and 18.
The method of B in combination with elements 15, 18 and 19.
The method of B in combination with elements 16, 18 and 19.

To facilitate a better understanding of the embodiments of the present disclosure, the following examples of preferred or representative embodiments are given. In no way should the following examples be read to limit, or to define, the scope of the disclosure.

EXAMPLES

A negative control sample was prepared by combining NATIONAL® 30 mesh Wyoming sodium bentonite clay (Bentonite Performance Minerals LLC, a subsidiary of Halliburton Energy Services) with deionized water at a loading of 22.5 pounds per barrel (22.5 g of solids per 350 mL of water) and mixing for 20 minutes with a multimixer.

Positive control samples were prepared by dry blending guar or polyanionic cellulose (PAC) modifying agents with the sodium bentonite clay, combining the dry mixture with deionized water and mixing as for the negative control sample. For both of the positive control samples, the total solids loading remained the same as that of the negative control sample, with the modifying agent concentration in the mixture being 2 wt. % (i.e., 22.05 g of sodium bentonite clay and 0.45 g of guar or polyanionic cellulose per 350 mL of water=22.5 pounds per barrel of solids).

Experimental samples were obtained in a similar manner to that of the positive control samples by dry blending various modifying agents with the clay before combining with deionized water. Variable concentrations of the modifying agents were tested, again with the total solids loading remaining fixed at 22.5 pounds per barrel. The modifying agents used were as follows: Polymer A (a copolymer of 2-acrylamido-2-methylpropane sulfonic acid and acrylamide), Polymer B (a diutan), Polymer C (a terpolymer of 2-acrylamido-2-methylpropane sulfonic acid, acrylamide, and 2-vinylpyrrolidone), and Polymer D (a terpolymer of 2-acrylamido-2-methylpropane sulfonic acid, acrylamide, and acrylic acid). The tested modifying agent concentrations are listed in Table 1 below.

Figure 1:
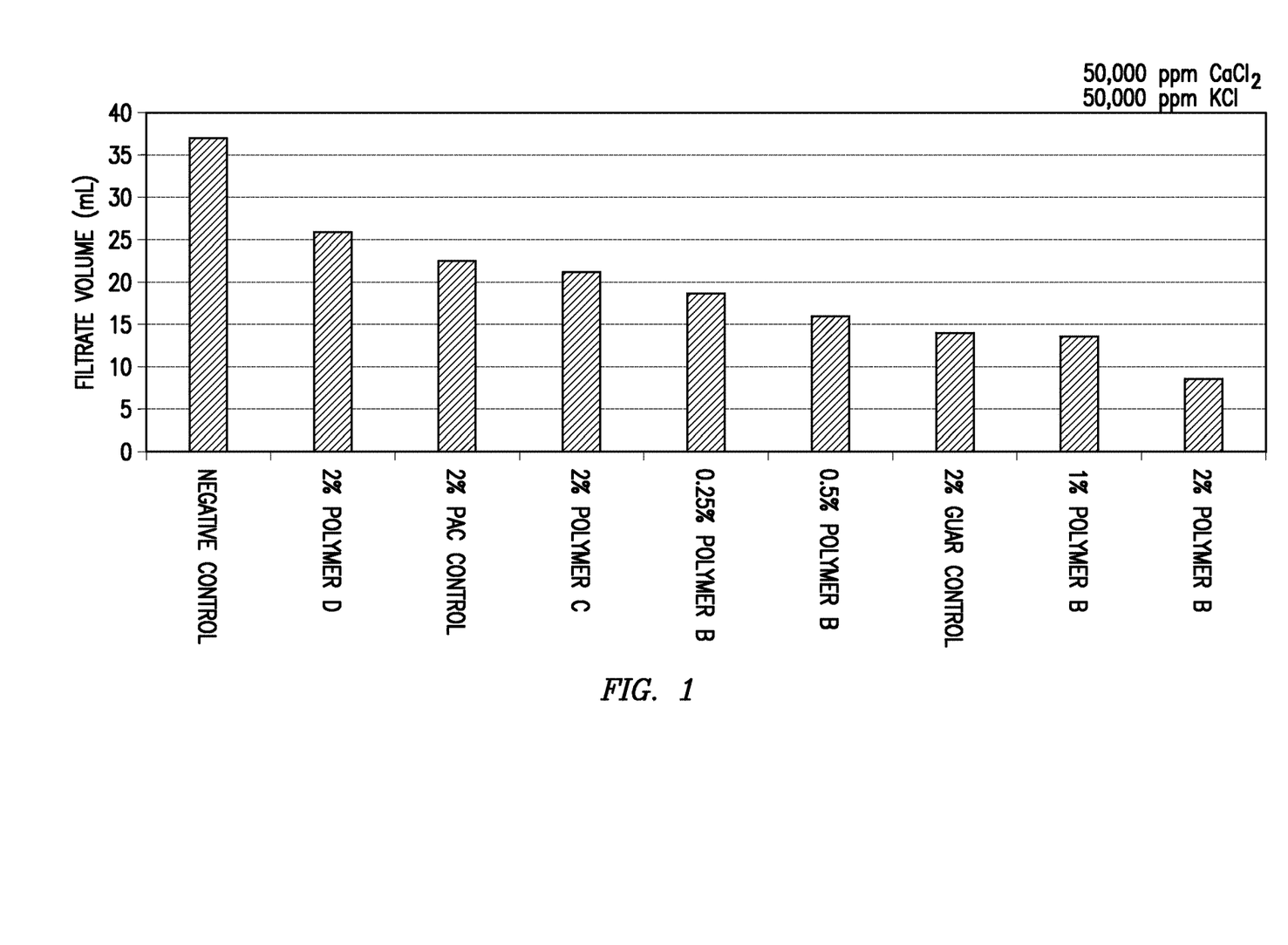
FIGS. 1-6 show illustrative fluid loss plots of sodium bentonite clay compositions in various ionic environments.
Figure 2:
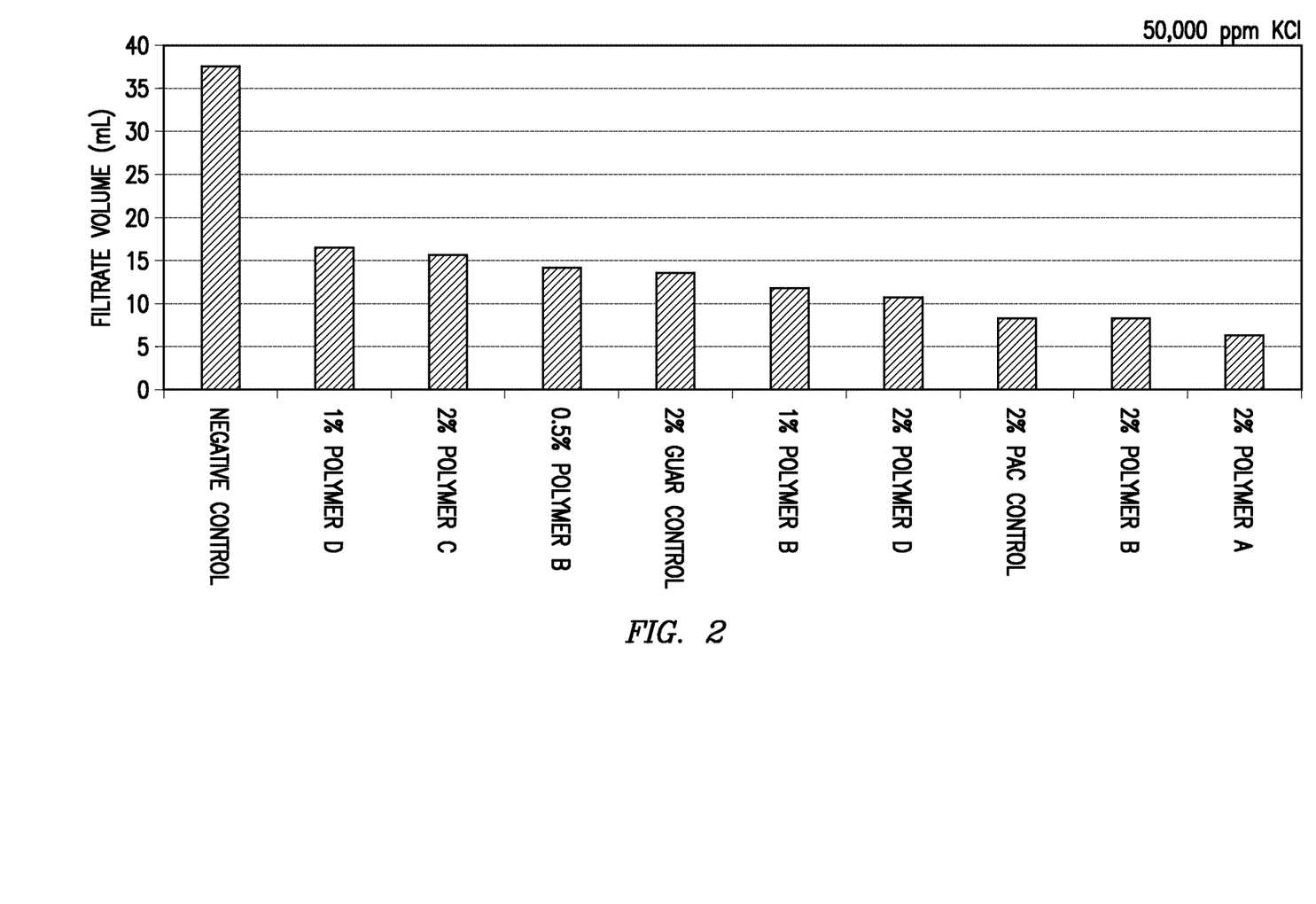
Figure 3:
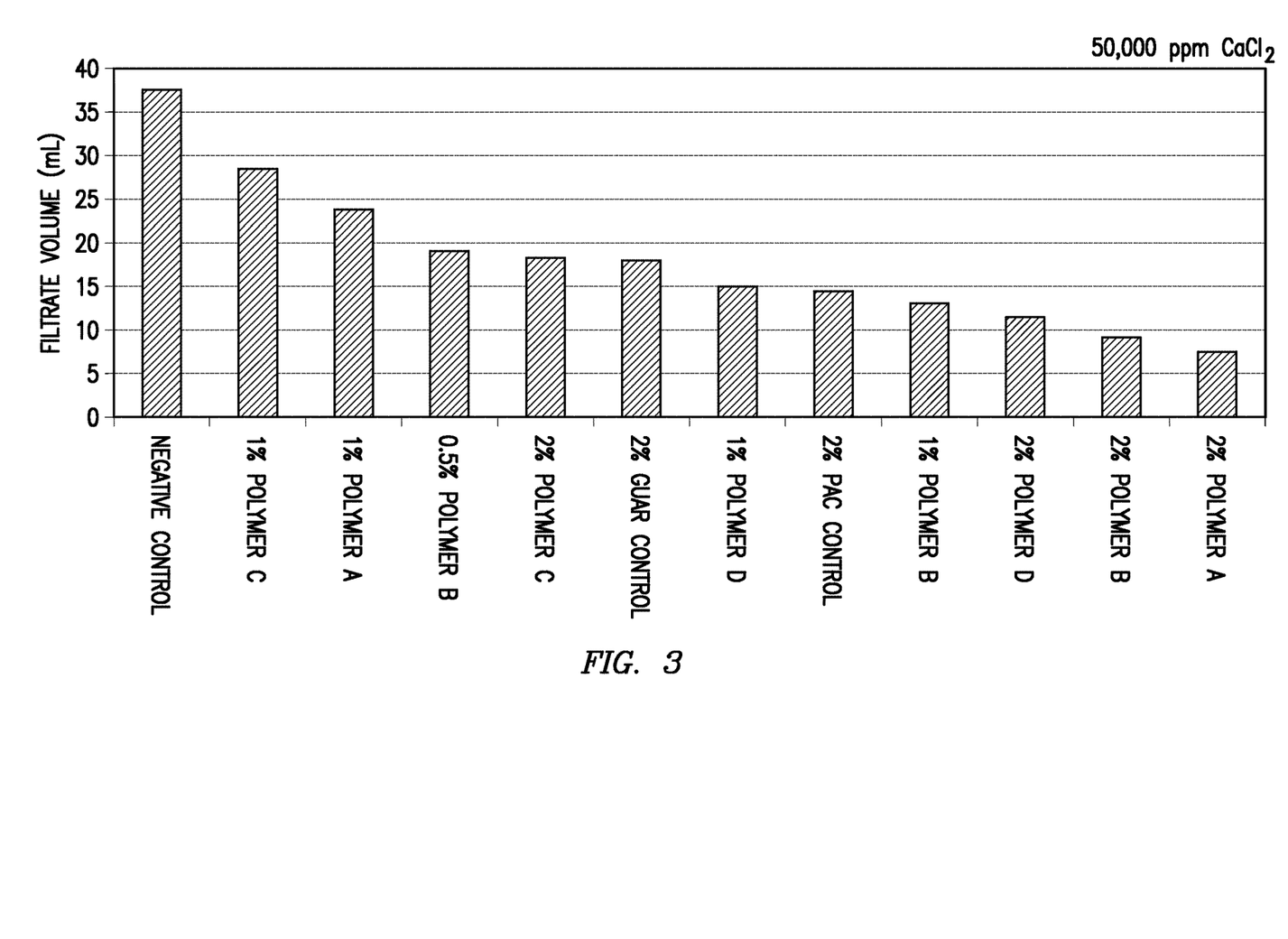
Figure 4:
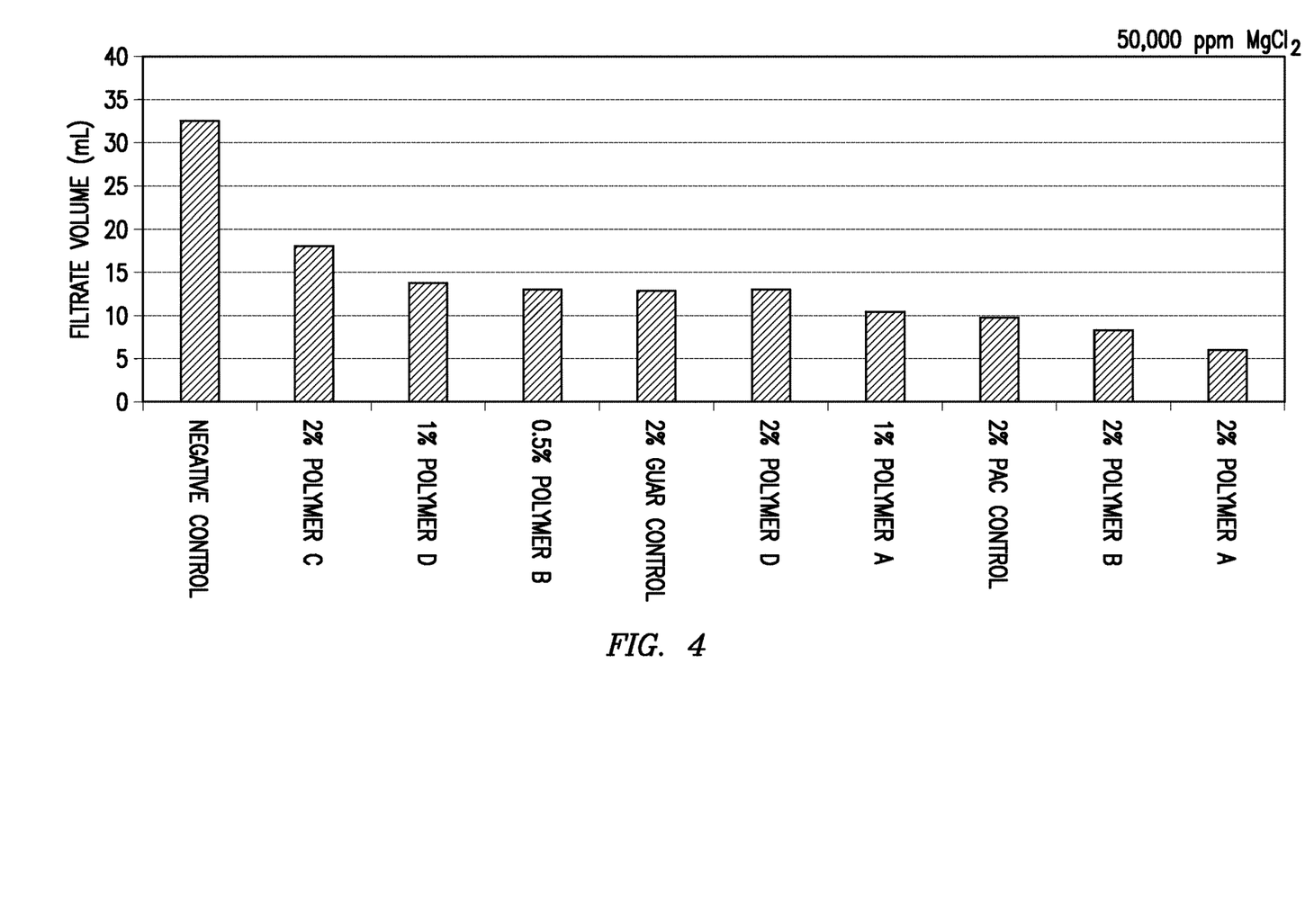
Figure 5:
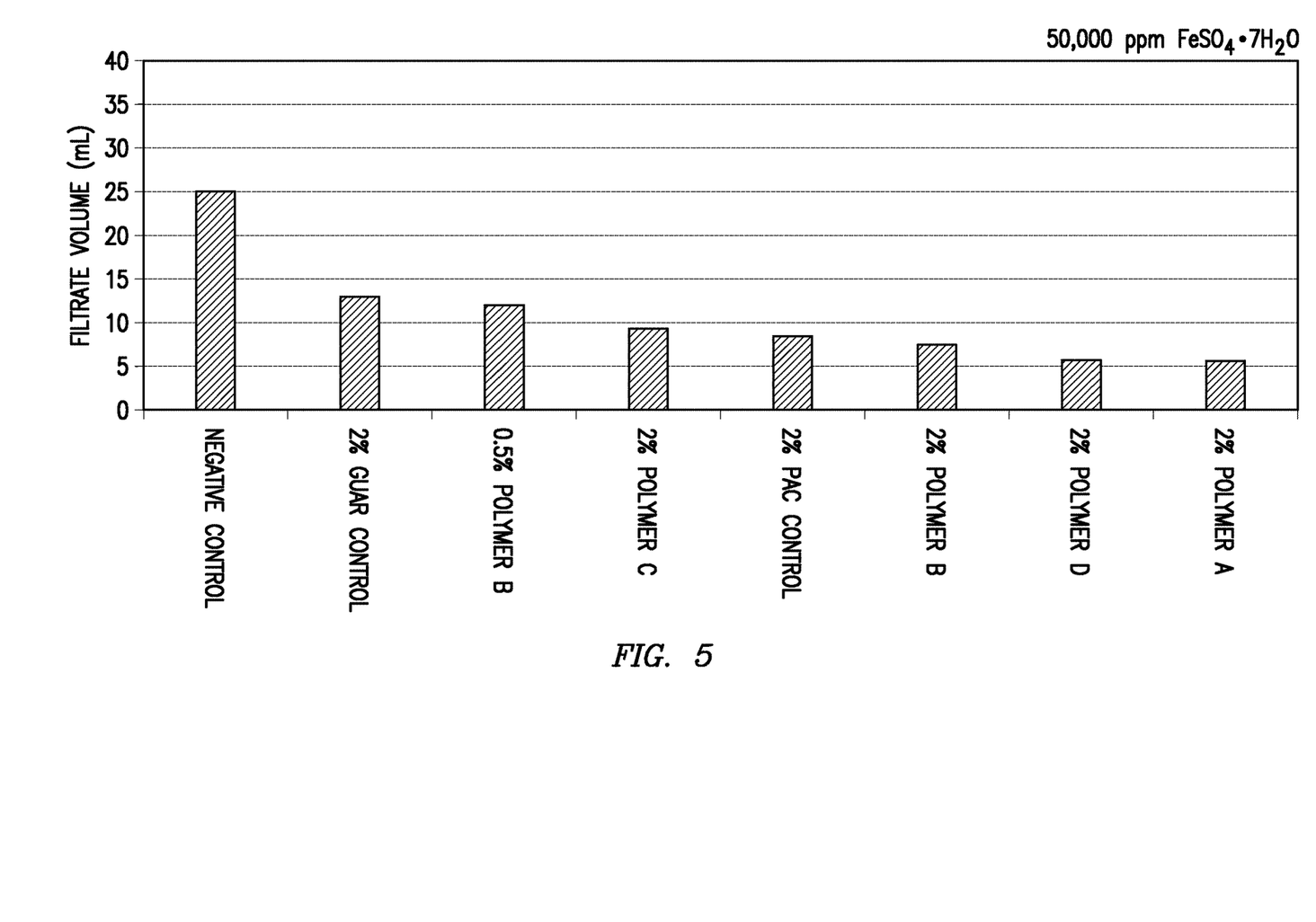
Figure 6:
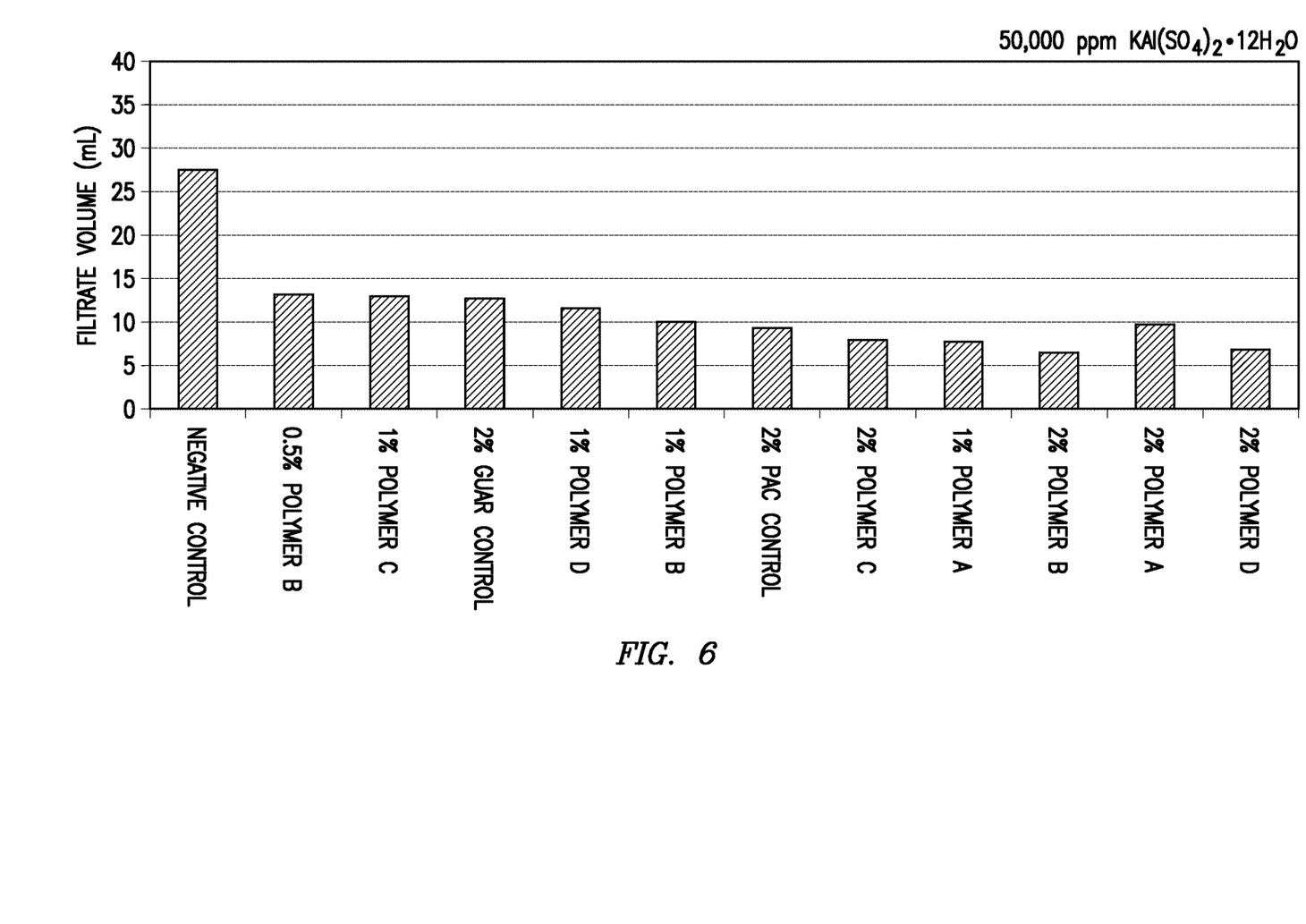

Each of the above clay suspension mixtures was introduced separately to an API fluid loss cell. The cell was then pressurized to 100 psi at room temperature for 30 minutes to form a filter cake at the bottom of the cell. Following the initial filter cake formation period, any residual liquid remaining in the fluid loss cell was discarded. At this point, 100 mL of testing fluid was placed on top of the filter cake in the fluid loss cell. The testing fluids contained various salts or salt mixtures at a concentration of 50,000 ppm for each individual salt. The fluid loss cell was then re-pressurized at room temperature to 100 psi and the filtrate volume was determined after one hour. The tested salts and the fluid loss performance results are shown in Table 1 and FIGS. 1-6.

TABLE 1

| | Added Salt (Concentration of 50,000 ppm for Each Salt) | | | | | |
|---|---|---|---|---|---|---|
| Modifying Agent | 1:1 KCl/CaCl$_2$$^a$ | KCl | CaCl$_2$ | MgCl$_2$ | FeSO$_4$$^b$ | KAl(SO$_4$)$_2$$^b$ |
| | Fluid Loss in mL Over One Hour (Fraction of Negative Control) | | | | | |
| None (Negative Control) | 37 (1.00) | 37.7 (1.00) | 38.5 (1.00) | 32.7 (1.00) | 25 (1.00) | 27.5 (1.00) |
| 2 wt. % Polyanionic Cellulose (Positive Control) | 22.5 (0.61) | 8.4 (0.22) | 14.6 (0.38) | 9.8 (0.30) | 8.4 (0.34) | 9.3 (0.34) |

TABLE 1-continued

| | Added Salt (Concentration of 50,000 ppm for Each Salt) | | | | | |
|---|---|---|---|---|---|---|
| Modifying Agent | 1:1 KCl/CaCl$_2$[a] | KCl | CaCl$_2$ | MgCl$_2$ | FeSO$_4$[b] | KAl(SO$_4$)$_2$[b] |
| | Fluid Loss in mL Over One Hour (Fraction of Negative Control) | | | | | |
| 2 wt. % Guar (Positive Control) | 14 (0.38) | 13.8 (0.37) | 18 (0.47) | 12.9 (0.39) | 13 (0.52) | 12.8 (0.47) |
| Polymer A | | | | | | |
| 2 wt. % | — | 6.4 (0.17) | 7.5 (0.19) | 5.9 (0.18) | 5.6 (0.22) | 9.9 (0.36) |
| 1 wt. % | — | — | 24 (0.62) | — | — | 7.8 (0.28) |
| Polymer B | | | | | | |
| 2 wt. % | 8.5 (0.23) | 8.4 (0.22) | 9.2 (0.24) | 8.3 (0.25) | 7.4 (0.30) | 6.7 (0.24) |
| 1 wt. % | 13.5 (0.36) | 12 (0.32) | 13 (0.34) | 10.5 (0.32) | — | 10 (0.36) |
| 0.5 wt. % | 16 (0.43) | 14.2 (0.38) | 19 (0.49) | 13 (0.40) | 12 (0.48) | 13.2 (0.48) |
| 0.25 wt. % | 18.5 (0.50) | — | — | — | — | — |
| Polymer C | | | | | | |
| 2 wt. % | 21 (0.57) | 15.7 (0.41) | 18.2 (0.47) | 18 (0.55) | 9.6 (0.38) | 8 (0.29) |
| 1 wt. % | — | — | 28.5 (0.74) | — | — | 13 (0.47) |
| Polymer D | | | | | | |
| 2 wt. % | 26 (0.70) | 10.8 (0.29) | 11.5 (0.30) | 12.6 (0.39) | 5.8 (0.23) | 6.9 (0.25) |
| 1 wt. % | — | 16.5 (0.44) | 15 (0.39) | 14 (0.43) | — | 11.5 (0.42) |

[a]100,000 ppm total salts
[b]FeSO$_4$ = FeSO$_4$•7H$_2$O
[c]KAl(SO$_4$)$_2$ = KAl(SO$_4$)$_2$•12H$_2$O As shown in Table 1, each of the tested modifying agents improved the fluid loss performance compared to the negative control samples. Most of the tested modifying agents also provided either superior or comparable fluid loss performance relative to the positive control samples at the control concentration of 2 wt. %. For some of the modifying agents, the fluid loss performance remained at least comparable at one-half or less that of the concentration of the positive control samples.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a barrier material comprising sodium bentonite clay and a modifying agent admixed with the sodium bentonite clay, the modifying agent comprising an anionic substance, wherein the anionic substance comprises diutan; and
forming a barrier layer comprising the barrier material.

2. The method of claim 1, further comprising:
mixing the sodium bentonite clay and the modifying agent together to form the barrier material.

3. The method of claim 1, wherein forming the barrier layer comprises compacting the barrier material upon soil, or forming a soil mixture comprising the barrier material and compacting the soil mixture.

4. The method of claim 1, wherein forming the barrier layer comprises applying a geosynthetic clay liner to a surface, the geosynthetic clay liner comprising a first geosynthetic layer and a second geosynthetic layer, the sodium bentonite clay and the modifying agent being sandwiched between the first geosynthetic layer and the second geosynthetic layer.

5. The method of claim 4, wherein the first geosynthetic layer and the second geosynthetic layer are independently selected from the group consisting of a fabric and a geomembrane.

6. The method of claim 4, wherein the first geosynthetic layer and the second geosynthetic layer have thicknesses from about 2 mm to about 25 mm.

7. The method of claim 1, wherein forming the barrier layer comprises applying a geosynthetic clay liner to a surface, the geosynthetic clay liner comprising a geomembrane to which the sodium bentonite clay and the modifying agent are adhesively bonded.

8. The method of claim 1, wherein the barrier layer comprises a portion of a pond, a reservoir, a landfill, a mining site, a fly ash repository site, or coal ash repository site.

9. The method of claim 1, further comprising:
contacting a leachate with the barrier layer, the leachate comprising an ionic substance.

10. The method of claim 9, wherein the leachate comprises at least one ionic substance selected from the group consisting of potassium ions, calcium ions, magnesium ions, iron ions, aluminum ions, zirconium ions, lead ions, cobalt ions, copper ions, tin ions, silver ions, fluoride ions, chloride ions, bromide ions, sulfate ions, and any combination thereof.

11. The method of claim 1, wherein the anionic substance further comprises a polymer containing a 2-acrylamido-2-methylpropanesulfonic acid monomer.

12. The method of claim 1, wherein the anionic substance further comprises a polymer containing a 2-acrylamido-2-methylpropanesulfonic salt.

13. The method of claim 1, wherein the anionic substance further comprises a polymer containing a 2-acrylamido-2-methylpropanesulfonic acid monomer, any salt thereof, and any combination thereof.

14. The method of claim 1, wherein the sodium bentonite clay has a $d_{90}$ particulate size of about 6 mesh and about 60 mesh.

15. The method of claim 1, wherein the sodium bentonite clay has a $d_{50}$ particulate size of about 400 mesh to about 20 mesh.

16. The method of claim 1, wherein the modifying agent further comprises a copolymer of 2-acrylamido-2-methylpropanesulfonic acid and acrylamide.

17. The method of claim 1, wherein the modifying agent further comprises a copolymer of 2-acrylamido-2-methylpropanesulfonic acid, acrylamide, and acrylic acid.

18. The method of claim 1, wherein the modifying agent further comprises a copolymer of 2-acrylamido-2-methylpropanesulfonic acid, acrylamide, and 2-vinylpyrollidone.

19. The method of claim 1, wherein the modifying agent further comprises an inorganic base, wherein the inorganic bases comprise sodium carbonate.

20. The method of claim 1, wherein the barrier material comprises about 0.1 wt % to about 15 wt % of the modifying agent.

* * * * *